March 11, 1941.   G. F. CHARD   2,234,689
HYDRAULIC BRAKE MECHANISM
Filed July 29, 1938
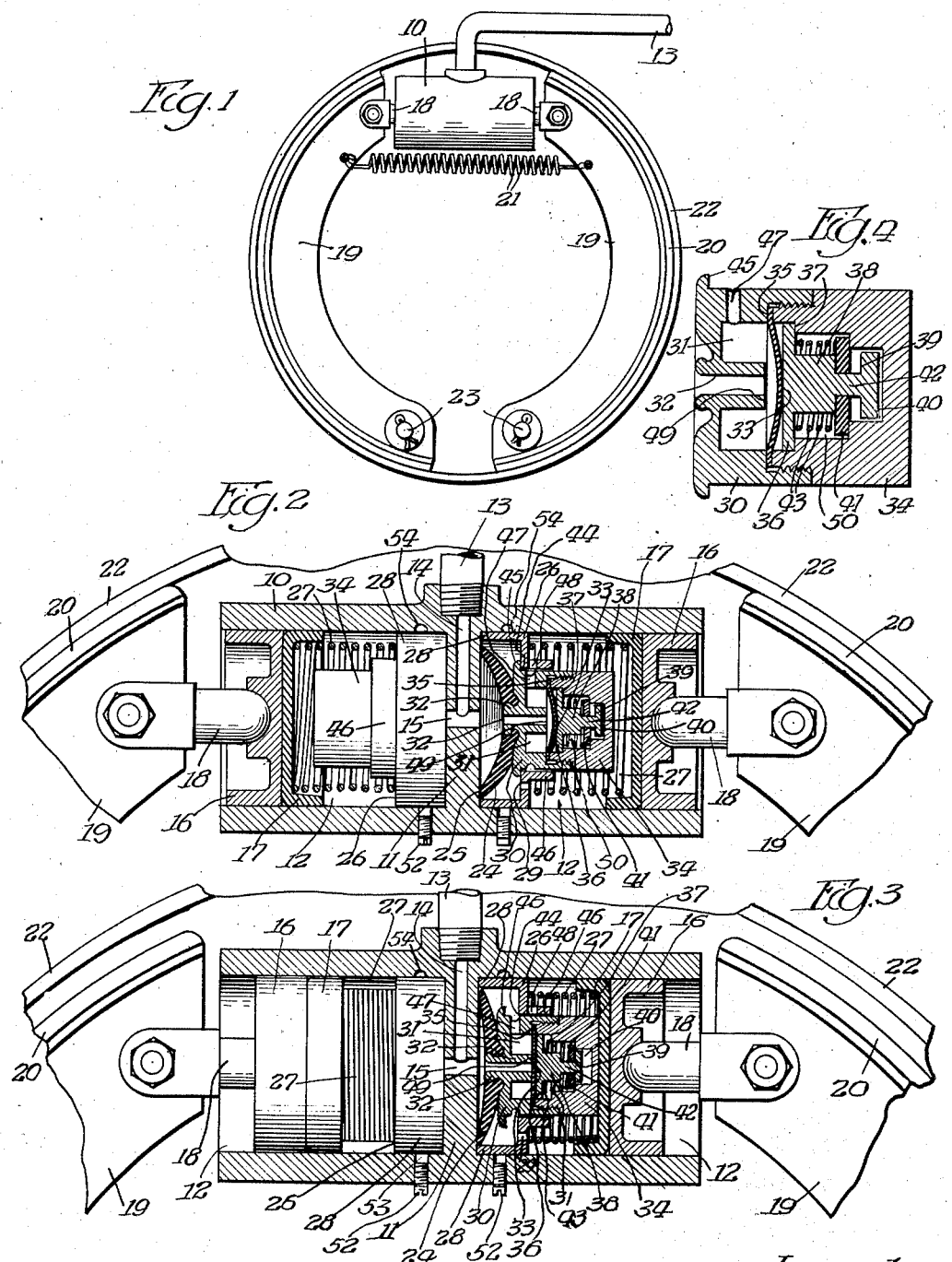
Inventor
George F. Chard
By [signature] Atty Patented Mar. 11, 1941

2,234,689

UNITED STATES PATENT OFFICE 2,234,689

HYDRAULIC BRAKE MECHANISM

George F. Chard, Elmwood Park, Ill., assignor of one-half to Joseph M. Sachs, Chicago, Ill.

Application July 29, 1938, Serial No. 221,939

20 Claims. (Cl. 188—152)

This invention relates in general to fluid operated brake mechanism, particularly adapted though not necessarily limited in use for automobiles and one of the objects of the invention is to provide fluid operated braking means in which the fluid is adapted to automatically compensate for wear of the brake shoe lining.

More particularly the invention relates to a compensating or an adjusting means which will be automatic in operation in compensating brake drum distortion, thereby maintaining practically constant, when the brakes are released, the clearance between the brake shoe and drum.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a diagrammatic view of a mechanism of this character constructed in accordance with the principles of this invention.

Figure 2 is a detail sectional view, on an enlarged scale, of the brake operating mechanism showing the position the parts will assume when the brakes are applied.

Figure 3 is a view similar to Figure 2 showing the position the parts will assume when the brake is released.

Figure 4 is an enlarged sectional view of the compensator.

The present invention is particularly adapted though not necessarily limited in use in connection with the hydraulic brake mechanism shown and described in my co-pending application Serial #56,414 filed December 28, 1935 now Patent 2,189,134, Feb. 6, 1940.

The brake operating mechanism consists essentially of a cylinder 10 which may be of any desired size and configuration and supported in any desired or suitable manner. The cylinder is open at both ends and in the present exemplification of the invention there is provided intermediate the ends, preferably midway thereof, an end or middle wall 11 dividing the cylinder into two chambers 12, in which chambers the operating mechanism is located.

The construction and operation of the mechanism in each of the chambers 12 is the same and the description of one will apply as well as to the other.

Fluid is supplied to the chambers 12 from any suitable source in any suitable manner preferably through a pipe 13 that communicates with a passage 14 in the wall 11 and this passage 14 communicates with another passage or opening 15 through the wall 11, the latter forming communication between the passage 14 and the chambers 12. Arranged in the chamber 12 is a piston 16 and a piston seal 17 abuts the piston. These piston seals 17 may be constructed of any suitable material preferably rubber or other flexible material and they are adapted for movement inwardly and outwardly within their chambers 12.

The piston 16 is connected by means of a rod 18 to a brake shoe 19 of the usual type and which is provided with brake lining 20 upon its face. The usual tension spring 21 connects the brake shoes 19 to cause them to move out of contact with the brake drum 22 whenever the brakes are released. The brake shoes 19 are pivotally supported by their other ends as at 23.

In order to compensate for wear on the brake lining 20 and to permit the brake shoes to be removed from contact with the brake drum only a predetermined distance, there is provided a valve member 24 one of which is arranged in each of the chambers 12. This valve member may be a concave convex flexible disc preferably formed of rubber or other suitable material and adapted to have its edge portion 25 engage the face of the wall 11.

The diameter of the valve 24 is less than the diameter of the chamber 12 so that the valve member may be flattened out within limits, as shown more particularly in Figure 3. There is also provided a cage or cup shaped member 26 which is held in place against the wall 11 preferably by means of a spring 27 and the cage or member 26 overlies and encloses the flexible valve member 24. The purpose of this cage or cup shaped member 26 is to limit the action of the flexible valve 24. The cage or cup shaped member 26 is preferably provided with a circular edge portion or flange 28 and a plurality of openings 29 formed in the wall thereof.

The valve 24 is normally of a concavo convex shape and its inherent resiliency tends normally to cause it to maintain such a form.

In assembling the mechanism the valve is placed in the chamber 12 and the cage 26 is placed thereover and the cage is retained in position by means of the spring 27 bearing against the cage and also against the piston seal 17.

In operation with these parts in this position, fluid from the pipe 13 will be discharged through the opening 15 into the chamber 12 under and past the valve 24. This will initially unseat the valve 24 so that fluid can flow around the edges of the valve through the openings 29 and into the chamber 12 on the other side of the valve to operate against the piston seal 17 and thereby apply the brake 19.

The valve 24 will remain unseated, or out of contact with the wall 11 until the pressure in the chamber 12 on the other side of the valve is sufficient to equalize the pressure of the fluid entering the port 15 on the first side of the valve. Under these conditions the pressures will be then neutralized and the valve 24 will maintain its original shape and the peripheral edge thereof will be in contact with the wall 11. Obviously when the chamber 12 is to be initially filled with fluid as above described, it is necessary to permit the air in the chamber 12 to escape. This is accomplished through the bleed opening valve 52.

The brakes will then be applied so long as the fluid pressure is prevented from escaping back through the pipe 13. This is accomplished by the operation of the ordinary brake pedal.

In the event of a wear between the brake shoe and the drum it is necessary to compensate the same and this is accomplished by increasing the volume of fluid on the other side of the valve and which operates against the piston seal 17. During this operation the fluid pressure entering through the port 15 will move the periphery of the valve 24 away from the wall 11 to permit the fluid to escape therearound and into the chamber 12. This condition will exist until the fluid pressure within the chamber 12 and on the other side of the valve 24 will overcome the pressure through the port 15 so that the fluid in the chamber 12 will be confined therein and will be prevented from escaping around the valve 24. That is, the valve 24 will then act as a check valve to prevent the escape of the fluid from the chamber 12.

When the fluid pressure is released in the pipe 13 the valve 24 being seated, none of the fluid in the chamber 12 can escape back to the line 13. When the pressure in the pipe 13 is released the pressure in the chamber 12 acting upon the valve 24 causes the latter to flatten out to the position shown in Figure 3 thereby permitting the brake shoe to be moved out of contact with the brake drum, the extent of movement of the brake shoe away from the drum will be controlled or limited by the space or distance between the wall 11 and the concave side of the valve 24. The distance which the shoes 19 are withdrawn from the drum 22 is determined by the space between the face of the wall 11 and the concave face of the valve 24.

In the present exemplification of the invention there is shown a passageway 32 (to be later described) which of course must be closed and opened at the proper times in order to permit of such operation of the valve 24 and the mechanism for opening and closing the valve and the effect of the operation of the valve 24 under the influence of such mechanism will be later described.

No matter what the thickness of the brake shoe lining 20 is, the same will be withdrawn only sufficiently to provide the necessary clearance whenever the brakes are released.

In order to compensate for drum distortion in all cases and to maintain the clearance between the brake shoe and the drum practically constant when the brakes are released, the adjuster or compensator forming the subject matter of this application is provided and operates automatically.

The compensator consists of a body portion 30 which is hollow as at 31 and is provided with a tubular stem 32 projecting beyond each face of the bottom of the hollow portion of the body. A diaphragm valve 33 extends across the hollow portion 31 and is secured in position by means of a cap member 34 secured to the body portion and clamping the diaphragm 33 by its edges against a shoulder 35. The portion of the stem 32 which extends into the hollow portion 31 of the body 30 preferably terminates a short distance below the shoulder 35. A valve plunger 36 is arranged within the cap member 34 and is adapted to engage a shoulder 37 for limiting the movement of the plunger in one direction. The stem 38 of the plunger 36 is provided with a head 39 which projects into a recess 40 in the cap member and a washer or member 41 engages a reduced portion 42 of the stem 38 to form an abutment for one end of a spring 43 which surrounds the stem 38, the other end of the spring contacting the plunger 36. The member or abutment 41 is removably secured to the stem 38. The body portion 30 of the compensator projects through an opening 44 in the wall of the cage or cup shaped member 26 and is provided with a flange 45 adapted to contact the wall of the cage to limit the movement of the compensator in one direction.

A flange 46 encompasses the opening 44 and also a portion of the body of the compensator. Openings 47 are provided and extend laterally through the wall of the body portion 30 and are adapted to communicate with openings 48 in the flange 46 to form a fluid passage.

The other end of the stem 32 which projects beyond the outer face of the body member 30 forms a means whereby the flexible valve 24 and the compensator may be connected together, the stem projecting through a suitable opening in the valve 24 and being frictionally held in position.

Referring to Figure 2, the parts are shown as they would appear when the brakes are applied. When the brakes are released the flexible valve 24 and the compensator are forced inwardly by movement of the piston 16 under the influence of the spring 21. The pressure thus caused by the spring 21 pulling the brake shoe 19 against the piston 16, forces the piston 16 and the piston seals 17 into the chamber 12, thus creating pressure in the chamber against the valve 24. This pressure will remain constant so long as the brakes are released but the pressure is not sufficient to raise the diaphragm 33 off its seat 49, which latter is the end of the stem 32.

The diaphragm valve 33 will leave its seat at a predetermined pressure which is above the pressure necessary to cause the brake shoe lining 20 to contact the drum 22. When the diaphragm is unseated so as to open the passage 32, under certain conditions, the pressure will be relieved and the fluid will pass through the port 47, thence out through the passage 32, through the valve 24, port 15, back to the line 13.

Thus when the brakes are released the compensator and flexible valve 24 will be forced inwardly and the valve 24 will be forced against the wall 11 and the diaphragm valve 33 being forced against its seat 49, the valve 24 being substantially flat against the face of the wall 11 as shown in Figure 3. The diaphragm 33 is forced against its seat through the medium of the spring 43.

Assuming now that the brake mechanisms have been filled with fluid and have been air bled, the initial adjustment will be effected in the following manner.

When the pedal is depressed, fluid will be forced through the pipe 13 against the flexible valve 24. This will force the flexible valve and the compensator into the chamber 12 overcoming fluid pressure therein and forcing the piston seal 17 and the piston 16 outwardly against the brake shoe 19, causing the lining 20 to contact the drum 22. At this point the diaphragm valve 33 will be upon its seat 49.

If, however, the flexible valve 24 assumes its shape as shown in Figure 2 before the brake shoe has contacted the drum then fluid will be forced between the valve 24 and the wall 11 until the brake shoe lining contacts the drum 22 and the brake shoe lining will then be moved against the drum.

As pressure is increased as in applying the brakes, the diaphragm valve 33 will be forced off of its seat 49 due to pressure of fluid overcoming the tension of the spring 43.

It is to be understood that the chamber or compartment 50 of the compensator in which the plunger 36 and stem 38 operate contains only air.

The parts will now all be in the position shown in Figure 2.

Assume now that the lining 20 wears away. As this happens, a minute amount of fluid will seep past the valve 24 into the chamber 12 compensating for this wear. The fluid cannot return from the chamber 12 because before the brake shoes are released from the drum, the diaphragm valve 33 will be closed. The brake shoe clearance is determined by the variable space in the valve 24.

Let it now be assumed that the brakes have been heated and that adjustment has followed due to the expansion of the drum.

The drum will cool and the contacts pressing against the brake shoe which in turn presses against the piston 16 and piston seal 17 will cause a slight rise in pressure of fluid in the chamber 12 over that caused by the spring 21. This pressures moves the diaphragm valve 33 off of its seat 49 thereby allowing some of the fluid in the chamber 12 to pass back into the line.

Full adjustment is effected by applying the brakes. The pressure thus caused would hold the diaphragm 33 off of its seat 49 and the flexible valve 24 would then take its shape as shown in Figure 2. The flexible valve 24 is shaped as shown in the drawing (Fig. 2). Thus when pressure is equal on both sides of it it takes its natural shape as shown in Figure 2. The shoes will then be against the drum and all of the parts will be in the position as shown in Figure 2. It will therefore be seen that when the brakes are released the original clearance between the brake shoe and the drum will be in effect, and each time the brakes are applied a new and complete adjustment is accomplished.

Fluid flows past the flexible valve 24 only when the brake drum wear is such as to permit a greater quantity of fluid to enter the cylinder 12.

Fluid flows through the compensator only after the brake shoes have contacted the drum and then only if abnormal conditions exist in the drum, such for instance as the drum expanding under the influence of heat, or the drum becoming distorted, due to pressure of self-energizing shoe, and as contracted after having been expanded.

It will be seen from this that merely taking up for wear is not sufficient and that the adjustment is necessary for causes other than wear; therefore complete adjustment will be effected automatically at each application of the brakes.

The compensator is provided with two chambers 50—31. The chamber 31 contains fluid and is always under pressure caused by the spring 21 as before explained, while the chamber 50 contains air and also the parts 36, 38 and 41, and also the spring 43.

The diaphragm valve 33 separates these chambers and is sealed tight by the cap 34 so that no fluid can enter the chamber 50.

The reduced portion 42 of the stem 38 to which the abutment 41 is secured is wider than the thickness of the abutment so that when the valve opens the plunger is free to move through the keeper or abutment until it contacts the cap 34.

It will thus be seen that when the pressure is reduced, as when the brakes are released, the spring 43 will force the plunger 36 against the diaphragm valve 33, forcing the latter onto its seat 49. The keeper or abutment 41 serves the important purpose of limiting the degree of tightness that the diaphragm 33 is pressed against its seat, which is just enough to seal the valve. This avoids distortion of the valve. The cage or cup shaped member 26 acts as a guide for the flexible valve 24 and the compensator, and it also limits the movement of the same while the spring 27 serves the double purpose of holding the cup shaped member or cage 26 in position and also the piston seal 17 against the piston 16.

The cylinder is provided with a valve 52 which controls a bleeder outlet 53 that has communication with a bleeder groove 54 so as to permit air in the cylinder to escape when the initial supply of fluid is being placed into the cylinder.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. Mechanism for automatically compensating the wear in brake shoes of fluid actuated brakes, embodying a cylinder having an inlet in communication with a source of supply of fluid pressure, a piston in the cylinder connected with a brake element, a flexible valve for controlling the inlet, said valve adapted to be opened by fluid pressure to admit fluid into the cylinder to move the piston in one direction, means tending normally to move the piston in the opposite direction causing the valve to close said inlet, a portion of said valve while in a closing position being movable to augment the pressure of the fluid in the cylinder while entrance of fluid into the cylinder beyond the valve is prevented, and compensating means operating automatically to relieve the fluid pressure within the cylinder, the last recited means embodying a supplemental valve mechanism influenced by fluid pressure in the cylinder.

2. Mechanism for automatically compensating the wear in brake shoes of fluid actuated brakes, embodying a cylinder having an inlet in communication with a source of supply of fluid pressure, a piston in the cylinder connected with a brake element, a flexible valve for controlling the inlet, said valve adapted to be opened by fluid pressure to admit fluid into the cylinder to move the piston in one direction, means tending normally to move the piston in the opposite direction causing the valve to close said inlet, a portion of said valve while in a closing position being movable to augment the pressure of the fluid in the cylinder while entrance of fluid into the cylinder beyond the valve is prevented, compensating means operating automatically to relieve the fluid pressure within the cylinder, the last recited means embodying a passage through said valve, and a supplemental valve influenced by fluid pressure in said cylinder for controlling the said passage.

3. Mechanism for automatically compensating the wear in brake shoes of fluid actuated brakes, embodying a cylinder having an inlet in communication with a source of supply of fluid pressure, a piston in the cylinder connected with a brake element, a flexible valve for controlling the inlet, said valve adapted to be opened by fluid pressure to admit fluid into the cylinder to move the piston in one direction, means tending normally to move the piston in the opposite direction causing the valve to close said inlet, a portion of said valve while in a closing position being movable to augment the pressure of the fluid in the cylinder while entrance of fluid into the cylinder beyond the valve is prevented, compensating means operating automatically to relieve the fluid pressure within the cylinder, the last recited means embodying a passage through said valve, a supplemental valve member for controlling the said passage, and means tending normally to move the supplemental valve in one direction, the said supplemental valve being movable in the opposite direction by fluid pressure, in opposition to the last said means.

4. Mechanism for automatically compensating the wear in brake shoes of fluid actuated brakes, embodying a cylinder having an inlet in communication with a source of supply of fluid pressure, a piston in the cylinder connected with a brake element, a flexible valve for controlling the inlet, said valve adapted to be opened by fluid pressure to admit fluid into the cylinder to move the piston in one direction, means tending normally to move the piston in the opposite direction causing the valve to close said inlet, a portion of said valve while in a closing position being movable to augment the pressure of the fluid in the cylinder while entrance of fluid into the cylinder beyond the valve is prevented, compensating means operating automatically to relieve the fluid pressure within the cylinder, the last recited means embodying a passage through said valve, a diaphragm valve for controlling said passage, and means tending normally to move the diaphragm in a direction to close said passage, said diaphragm being movable in the opposite direction by fluid pressure and against the stress of the last said means.

5. Mechanism for automatically compensating the wear in brake shoes of fluid actuated brakes, embodying a cylinder having an inlet in communication with a source of supply of fluid pressure, a piston in the cylinder connected with a brake element, a flexible valve for controlling the inlet, said valve adapted to be opened by fluid pressure to admit fluid into the cylinder to move the piston in one direction, means tending normally to move the piston in the opposite direction causing the valve to close said inlet, a portion of said valve while in a closing position being movable to augment the pressure of the fluid in the cylinder while the entrance of fluid into the cylinder beyond the valve is prevented, compensating means operating automatically to relieve the fluid pressure within the cylinder, the last recited means embodying a supplemental valve mechanism influenced by fluid pressure in the cylinder, and means for limiting the movement of the supplemental valve.

6. Mechanism for automatically compensating the wear in brake shoes of fluid actuated brakes, embodying a cylinder having an inlet in communication with a source of supply of fluid pressure, a piston in the cylinder connected with a brake element, a flexible and floating valve for controlling the inlet, said valve adapted to be opened by fluid pressure to admit fluid into the cylinder to move the piston in one direction, means for limiting the movement of said valve, means tending normally to move the piston in the opposite direction causing the valve to close said inlet, a portion of said valve while the latter is in a closing position being movable to augment the pressure of the fluid in the cylinder while the entrance of fluid into the cylinder beyond the valve is prevented, and compensating means operating automatically to relieve the fluid pressure within the cylinder.

7. Mechanism for automatically compensating the wear in brake shoes of fluid actuated brakes, embodying a cylinder having an inlet connected with a source of fluid pressure supply, a flexible valve within the cylinder for controlling said inlet, a piston in the cylinder, means interposed between the piston and the valve for limiting the opening movement of the latter, said valve being yieldable under pressure through said inlet to permit fluid pressure to enter the cylinder to move the piston in one direction, means for moving the piston in the opposite direction, the movement of the piston in the last said direction operating to cause the valve to close said inlet, a portion of the said valve being operable to augment the fluid pressure in the cylinder while maintaining any additional supply of fluid out of commingling relation with the fluid already in the cylinder, and means operable automatically to relieve the pressure of the initial supply of fluid which is trapped in the cylinder.

8. Mechanism for automatically compensating the wear in brake shoes of fluid actuated brakes, embodying a cylinder having an inlet connected with a source of fluid pressure supply, a flexible valve within the cylinder for controlling said inlet, a piston in the cylinder, means interposed between the piston and the valve for limiting the opening movement of the latter, said valve being yieldable under pressure through said inlet to permit fluid pressure to enter the cylinder to move the piston in one direction, means for moving the piston in the opposite direction, the movement of the piston in the last said direction operating to cause the valve to close said inlet, a portion of the said valve being operable to augment the fluid pressure in the cylinder while maintaining any additional supply of fluid out of commingling relation with the fluid already in the cylinder, and means operable automatically to relieve the pressure of the initial supply of fluid which is trapped in the cylinder, the last recited means embodying a passage through the said valve, and a supplemental valve for controlling the said passage, said supplemental valve being disposed within the cylinder and being controlled in its operation by the fluid pressure in the cylinder.

9. Braking mechanism embodying a cylinder provided with an inlet connected to a source of supply of fluid pressure, a piston in the cylinder, a brake drum, a brake element operable by the piston, a flexible convex concavo shaped valve positioned to overlie said inlet, a retainer for limiting the movement of the valve, said flexible valve adapted to permit fluid to pass into the cylinder to move the piston in one direction and to prevent the return of the fluid, means for moving the piston in the opposite direction, said valve adapted to flatten upon release of brakes, and means operating automatically to maintain the clearance space between the brake element and drum substantially constant when the brake is released, the last recited means embodying mechanism in addition to said valve within the cylinder and automatically operable under predetermined conditions for varying the fluid pressure in the cylinder.

10. Braking mechanism embodying a cylinder provided with an inlet connected to a source of supply of fluid pressure, a brake drum, a piston in the cylinder, a brake element operable by the piston and movable toward and away from the co-operating element, a flexible convex concavo shaped valve positioned to overlie said inlet, a retainer for limiting the movement of the valve, said flexible valve adapted to permit fluid to pass into the cylinder to move the piston in one direction and to prevent the return of the fluid, means for moving the piston in the opposite direction, said valve adapted to flatten after braking operation, and means compensating any change in the extent of movement of one of the brake elements toward and away from the said co-operating brake element, the last recited means embodying a passage through the valve and a supplemental valve automatically operable to control the said passage whereby the fluid pressure in the cylinder will be varied.

11. Braking mechanism embodying a cylinder provided with an inlet connected to a source of supply of fluid pressure, a piston in the cylinder, co-operating brake elements, one of said elements being operable by the piston and movable toward and away from the other element, a flexible convex concavo shaped valve positioned to overlie said inlet, a retainer for limiting the movement of the valve, said flexible valve adapted to permit fluid to pass into the cylinder to move the piston in one direction and to prevent the return of the fluid, means for moving the piston in the opposite direction, said valve adapted to flatten after braking operation, and means compensating any change in the extent of movement of one of said brake elements towards and away from the other brake element, the last recited means embodying a compensator connected to and movable with said valve, said compensator embodying a passage for relieving the fluid pressure in the cylinder and a supplemental valve for controlling said passage.

12. Braking mechanism embodying a cylinder provided with an inlet connected to a source of supply of fluid pressure, a piston in the cylinder, co-operating brake elements, one of said elements being operable by the piston and movable toward and away from the other element, a flexible convex concavo shaped valve positioned to overlie said inlet, a retainer for limiting the movement of the valve, said flexible valve adapted to permit fluid to pass into the cylinder to move the piston in one direction and to prevent the return of the fluid, means for moving the piston in the opposite direction, said valve adapted to flatten after braking operation, means compensating any change in the movement of one of the brake elements toward and away from the co-operating brake element, the last recited means embodying a compensator connected to and movable with said valve, said compensator embodying a passage for relieving the fluid pressure in the cylinder, a supplemental valve for controlling said passage, and means tending normally to move the supplemental valve in one direction, said supplemental valve being movable in the opposite direction by fluid pressure in the cylinder.

13. A cylinder for a fluid pressure actuated brake, said cylinder having a fluid inlet, a pair of valves for independently controlling said inlet, one of said valves adapted to open under fluid pressure to permit the fluid to enter the cylinder, both of said valves being operable to close said inlet to the entrance of fluid into the cylinder, the other of said valves being operable under fluid pressure to establish communication between the cylinder and said inlet, a piston in the cylinder, movable in one direction by fluid pressure, means for moving the piston in the opposite direction, and a brake element influenced by the movement of said piston.

14. A cylinder for a fluid pressure actuated brake, said cylinder having a fluid inlet, a pair of valves for independently controlling said inlet, one of said valves adapted to open under fluid pressure to permit the fluid to enter the cylinder, both of said valves being operable to close said inlet to the entrance of fluid into the cylinder, the other of said valves being operable under fluid pressure to establish communication between the cylinder and said inlet, a piston in the cylinder, movable in one direction by fluid pressure, means for moving the piston in the opposite direction, and a brake element influenced by the movement of said piston, one of the said valves being flexible and convex concavo in shape adapted to be flattened over said inlet by fluid pressure in the cylinder.

15. A brake cylinder for hydraulic brakes having a wall provided with an inlet connected with a source of supply of fluid under pressure, a perforated cup member adjacent said wall, a piston in the cylinder, a flexible convex concavo shaped valve in said cup overlying said inlet, said valve adapted to permit fluid to pass into said cylinder to move said piston in one direction, co-operating brake elements, one of said elements being actuated by the piston and movable toward and away from the other and co-operating brake element, said valve adapted to flatten out after braking operation, and means for compensating any change in the extent of movement of one of said brake elements toward and away from the co-operating brake element, the last said means embodying a compensator embodying a passage through said valve and a supplemental valve for controlling said passage.

16. A brake cylinder for hydraulic brakes having a wall provided with an inlet connected with a source of supply of fluid under pressure, a perforated cup member adjacent said wall, a piston in the cylinder, a flexible convex concavo shaped valve in said cup overlying said inlet, said valve adapted to permit fluid to pass into said cylinder to move said piston in one direction, co-operating brake elements, one of said elements being actuated by the piston and movable toward and away from a co-operating element, said valve adapted to flatten out after the braking operation, and means for compensating any change in the extent of movement of one of the brake elements toward and away from the co-operating brake element, the last said means embodying a compensator embodying a passage through said valve and a supplemental valve for controlling said passage, the said supplemental valve embodying a diaphragm, and means for moving the diaphragm in one direction, the diaphragm being movable in the opposite direction by fluid pressure in the cylinder.

17. Braking mechanism embodying a brake element movable toward and away from a co-operating brake element, means for compensating any change in the extent of movement of one of the brake elements toward and away from the co-operating brake element, said compensating means embodying a unit provided with a closed chamber having an inlet and outlet opening, a diaphragm for controlling said opening, a plunger, means for moving the plunger in one direction to move the diaphragm to close said opening, said diaphragm operating under fluid pressure through said opening to move the plunger in the opposite direction, and means for limiting the movements of the plunger.

18. Braking mechanism embodying a brake element movable toward and away from a co-operating brake element, means for compensating any change in the extent of movement of the brake element toward and away from the co-operating brake element, said compensating means embodying a unit provided with a closed chamber having an inlet and outlet opening, a diaphragm for controlling said opening, a plunger, means for moving the plunger in one direction to move the diaphragm to close said opening, said diaphragm operating under fluid pressure through said opening to move the plunger in the opposite direction, means for limiting the movements of the plunger, said plunger having a reduced portion to provide spaced abutments, the last said means embodying a member disposed between said abutments to be engaged respectively thereby, an additional abutment engaged by said member, and resilient means for maintaining the said member against the last said abutment.

19. Braking mechanism embodying a brake element movable toward and away from a co-operating brake element, means for compensating any change in the extent of movement of one of the brake elements toward and away from the co-operating brake element, said compensating means embodying a unit provided with a closed chamber having an inlet and outlet opening, a diaphragm for controlling said opening, a plunger, means for moving the plunger in one direction to move the diaphragm to close said opening, said diaphragm operating under fluid pressure through said opening to move the plunger in the opposite direction, means for limiting the movements of the plunger, said plunger having a reduced portion to provide spaced abutments, the last said means embodying a member disposed between said abutments to be engaged respectively thereby, an additional abutment engaged by said member, and resilient means for maintaining the said member against the last said abutment, the first recited means comprising the said resilient element.

20. Braking mechanism embodying a brake element movable toward and away from a co-operating brake element, means for compensating any change in the extent of movement of one of the brake elements toward and away from the co-operating brake element, said compensating means embodying a unit provided with a closed chamber having an inlet and outlet opening, a diaphragm for controlling said opening, a plunger, means for moving the plunger in one direction to move the diaphragm to close said opening, said diaphragm operating under fluid pressure through said opening to move the plunger in the opposite direction, and means for limiting the movements of the plunger, the said unit comprising hollow separable sections forming said chamber, the periphery of said diaphragm being anchored between said sections.

GEORGE F. CHARD.